W. A. Wood.
Harvester Cutter.
No. 37066.  Patented Dec. 2. 1862.
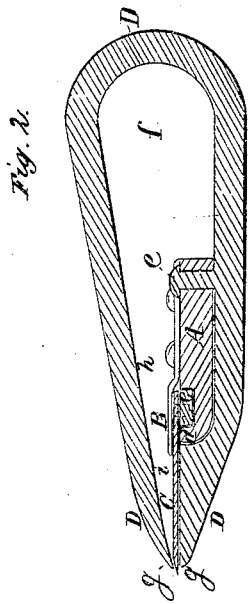
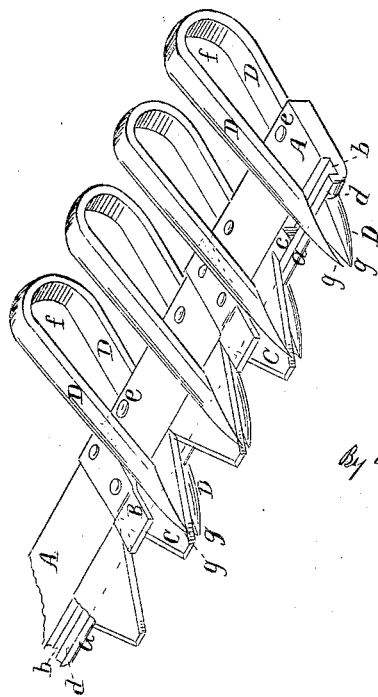
W. A. Woods.
By atty. A. B. Stoughton.
Witnesses
E. Evans Jr.
P. E. Wilson.

UNITED STATES PATENT OFFICE.

W. A. WOOD, OF HOOSICK FALLS, NEW YORK.

IMPROVEMENT IN CUTTING APPARATUS FOR HARVESTERS.

Specification forming part of Letters Patent No. 37,066, dated December 2, 1862.

*To all whom it may concern:*

Be it known that I, W. A. WOOD, of Hoosick Falls, in the county of Rensselaer and State of New York, have invented a certain new and useful Improvement in the Cutting Apparatus of Grain and Grass Harvesting Machines; and I do hereby declare the following to be a full, clear, and exact description of the same, reference being had to the accompanying drawings, making a part of this specification, in which—

Figure 1 represents in perspective a portion of a finger and cutter bar provided with guards and cutters after my plan, and Fig. 2 represents a section taken through one of the guards and through the finger and cutter bars and cutters.

Similar letters of reference, where they occur in the separate figures, denote like parts of the apparatus in both.

In very thick, short grass, embedded in which are mice-nests, or where the last year's crop has been allowed to remain on the ground, and becomes fallen and tangled at the roots of the new crop, it is next to impossible, with any of the present known or used cutting apparatus, to work without their choking or clogging up.

The object of my invention is to make a cutting apparatus that will work in short, thick, or tangled grass without clogging; and the nature of my invention consists in the peculiar construction of the guards or fingers, and their adaptation to the sickle and sickle-bar, as well as to the finger-bar, so as to leave unobstructed space for the otherwise clogging matter to freely pass out.

To enable others skilled in the art to make and use my invention, I will proceed to describe the same with reference to the drawings.

A is a metallic finger-bar made of iron or steel, rounded up in front, as shown at $a$, into a runner form, so as to readily and freely pass over the ground. Near the front edge of this finger-bar is formed a groove, $b$, in which the cutter-bar $c$ lies and works, it being held in its groove by bearers B, properly disposed throughout its length.

The sickles or cutters C are united to this bar $c$ in any of the usual well-known ways, said cutters or blades C having a support on the ledge $d$, that is left between the groove and the front edge of the finger-bar.

The fingers or guards D are of a harp or bow shape, and are best made of steel. They are in contact with the finger-bar at its front and bottom only, and bolted thereto, as at $e$. The guards surround the finger-bar, extend on the same plane in rear of the finger-bar, and have a wide unobstructed space in their bow or bend, as seen at $f$, to prevent any grass from hanging to or getting entangled with them. The points $g$ of the guards project beyond the front of the finger-bar and terminate at or near the points of the cutters C, and approach each other near enough to only allow the cutters free play between them, and should any grass hang to the points of the guards the cutters will cut it loose and allow it to drop out. The under part of the guard, where it projects in front of the finger-bar, is made heavier and broader than its other portions, so as to make a support for the blades, and present a holding-edge to the grass, while the cutters sever it. The top projecting portion of the guard is drawn down thinner and smaller, so as to spring or yield a little to facilitate the throwing out of the clogging matter, and terminate in a point, $g$, as does also the under portion.

These guards are readily and cheaply made from a flat or half-round bar of steel, one point or end being upset to thicken it up for the cutter-support, and the other end being drawn down to a point, the bending by a die or former being a very simple operation. Besides the unobstructed space behind the finger-bar, that part over the finger-bar and the cutting apparatus, as at $h$ and $i$, is also unincumbered by the guards, leaving comparatively nothing near the working parts for the grass to cling to or wedge into. Extending the guards in rear of the finger-bar allows the stubble, as the machine advances, to brush from the bow part of the guard any cut grass that would otherwise hang there. The points of the guards being on or nearly on a line with the front of the knife-sections, mice-nests or dead grass is cut, and thus prevented from catching, as it would do, and be dragged along, where guards project beyond the front of the knife-sections.

Having thus fully described the nature and object of my invention, what I claim is—

The harp or bow shaped guard surrounding the finger-bar and leaving the unobstructed space herein represented between itself and the finger-bar, substantially as and for the purpose described.

W. A. WOOD.

Witnesses:
 LEN. KING,
 LESTER FISK.